US012236878B2

(12) United States Patent
Heo et al.

(10) Patent No.: US 12,236,878 B2
(45) Date of Patent: Feb. 25, 2025

(54) DISPLAY APPARATUS AND OPERATING METHOD THEREOF

(71) Applicant: LG Display Co., Ltd., Seoul (KR)

(72) Inventors: Junhaeng Heo, Daegu (KR); Sejeong Wi, Yongin-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/529,906

(22) Filed: Dec. 5, 2023

(65) Prior Publication Data

US 2024/0221659 A1 Jul. 4, 2024

(30) Foreign Application Priority Data

Dec. 28, 2022 (KR) ........................ 10-2022-0187302

(51) Int. Cl.
*G09G 3/3233* (2016.01)

(52) U.S. Cl.
CPC ... *G09G 3/3233* (2013.01); *G09G 2300/0842* (2013.01); *G09G 2310/08* (2013.01); *G09G 2320/041* (2013.01)

(58) Field of Classification Search
None
See application file for complete search history.

(56) References Cited

U.S. PATENT DOCUMENTS 9,524,678 B2 12/2016 Bae et al.
2022/0215802 A1* 7/2022 Moriya ................ G09G 3/3233

FOREIGN PATENT DOCUMENTS

KR 102085167 B1 3/2020

* cited by examiner

*Primary Examiner* — Carl Adams
(74) *Attorney, Agent, or Firm* — Seed IP Law Group LLP

(57) ABSTRACT

According to an aspect of the present disclosure, a display apparatus may include a display panel in which a pixel circuit including a light emitting diode and a driving transistor connected to the light emitting diode is disposed; a memory configured to store a first current value corresponding to a first temperature and a second current value corresponding to a second temperature; a temperature sensor; and a control circuit configured to identify a threshold voltage of the light emitting diode using the first current value when a temperature sensed by the temperature sensor corresponds to the first temperature, and identifies the threshold voltage of the light emitting diode using the second current value when the temperature sensed by the temperature sensor corresponds to the second temperature.

16 Claims, 6 Drawing Sheets

DISPLAY APPARATUS AND OPERATING METHOD THEREOF

CROSS-REFERENCE TO RELATED APPLICATIONS

This application claims the priority of Korean Patent Application No. 10-2022-0187302 filed on Dec. 28, 2022, in the Korean Intellectual Property Office, the disclosure of which is incorporated herein by reference.

BACKGROUND

Technical Field

The present disclosure related to a display apparatus and an operating method thereof.

Description of the Related Art

As the information society is developed, demands for display devices for displaying images are increased in various forms. Recently, various display devices such as a liquid crystal display (LCD) device, a plasma display panel (PDP), and an organic light emitting display (OLED) device are utilized.

The display apparatus performs an operation using various signals or various power sources. For example, the display apparatus supplies a power, such as a data voltage and a high potential voltage, to the display panel to operate the display panel.

The display apparatus performs a compensation operation. The compensation operation reduces a deviation between light emitting diodes included in the display panel to improve the visibility and the image quality.

BRIEF SUMMARY

The inventors have realized that a more precise compensation operation that takes into consideration a state of the display apparatus is beneficial to improve the image quality. A benefit to be achieved by the present disclosure is to provide a display apparatus which performs compensation using a current which is selected according to a temperature of a display apparatus to effectively improve an image quality and an operating method thereof.

Benefits of the present disclosure are not limited to the above-mentioned benefits, and other benefits, which are not mentioned above, can be clearly understood by those skilled in the art from the following descriptions.

According to an aspect of the present disclosure, a display apparatus may include a display panel in which a pixel circuit including a light emitting diode and a driving transistor connected to the light emitting diode is disposed; a memory configured to store a first current value corresponding to a first temperature and a second current value corresponding to a second temperature; a temperature sensor; and a control circuit configured to identify a threshold voltage of the light emitting diode using the first current value when a temperature sensed by the temperature sensor corresponds to the first temperature, and identifies the threshold voltage of the light emitting diode using the second current value when the temperature sensed by the temperature sensor corresponds to the second temperature.

According to an aspect of the present disclosure, an operating method of a display apparatus may include sensing a temperature corresponding to the display apparatus by a temperature sensor; identifying a current value corresponding to a temperature range in which the temperature is included; identifying a threshold voltage of a light emitting diode based on the current value; and compensating a display panel included in the display apparatus based on the threshold voltage.

Other detailed matters of example embodiments are included in the detailed description and the drawings.

According to the present disclosure, the display apparatus and the operating method thereof may effectively improve an image quality of the display apparatus by performing appropriate compensation according to a state of the display apparatus.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
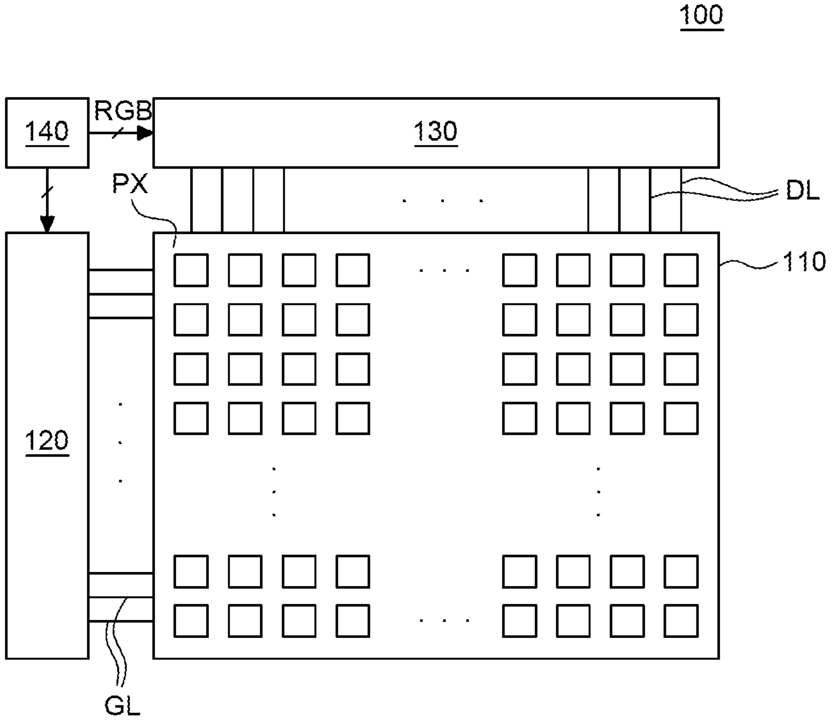
FIG. 1 is a block diagram of a display apparatus according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “consist of” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When an element or layer is disposed “on” another element or layer, the element or layer may be disposed directly “on” another layer or another element or other layers or other elements may be interposed therebetween.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

A transistor used for a display apparatus of the present disclosure may be implemented by one or more transistors among n-channel transistors (NMOS) and p-channel transistors (PMOS). The transistor may be implemented by an oxide semiconductor transistor having an oxide semiconductor as an active layer or an LTPS transistor having a low temperature poly-silicon (LTPS) as an active layer. The transistor may include at least a gate electrode, a source electrode, and a drain electrode. The transistor may be implemented as a thin film transistor (TFT) on a display panel. In the transistor, carriers flow from the source electrode to the drain electrode. In the case of the n-channel transistor NMOS, since the carriers are electrons, in order to allow the electrons to flow from the source electrode to the drain electrode, a source voltage may be lower than a drain voltage. The current in the n-channel transistor (NMOS) flows from the drain electrode to the source electrode and the source electrode may serve as an output terminal. In the case of the p-channel transistor (PMOS), since the carriers are holes, in order to allow the holes to flow from the source electrode to the drain electrode, a source voltage is higher than a drain voltage. In the p-channel transistor (PMOS), the holes flow from the source electrode to the drain electrode so that current flows from the source to the drain and the drain electrode may serve as an output terminal. Accordingly, the source and the drain may be switched in accordance with the applied voltage so that it should be noted that the source and the drain of the transistor are not fixed. In the present specification, it is assumed that the transistor is an n-channel transistor (NMOS), but is not limited thereto so that the p-channel transistor may be used and thus a circuit configuration may be changed.

A gate signal of transistors which are used as switching elements swings between a turn-on voltage and a turn-off voltage. The turn-on voltage is set to be higher than a threshold voltage Vth of the transistor, and the turn-off voltage is set to be lower than the threshold voltage Vth of the transistor. The transistor is turned on in response to the turn-on voltage and is turned off in response to the turn-off voltage. In the case of the NMOS, the turn-on voltage is a high voltage and the turn-off voltage may be a low voltage. In the case of the PMOS, the turn-on voltage may be a low voltage and the turn-off voltage may be a high voltage.

Hereinafter, the present disclosure will be described in detail with reference to the drawings.

FIG. 1 is a block diagram illustrating a display apparatus according to an example embodiment of the present disclosure.

Referring to FIG. 1, a display apparatus 100 includes a display panel 110, a gate driver 120, a data driver 130, and a power supply unit 140.

The display panel 110 includes a substrate using glass or plastic and a plurality of gate lines GL and a plurality of data lines DL disposed on the substrate to overlap each other. A plurality of pixels PX is positioned at regions of overlap of the plurality of gate lines GL and the plurality of data lines DL. An area in which a plurality of pixels PX implementing images is disposed may be referred to as a display area and an area which is disposed at the outside of the active area and the plurality of pixels PX is not disposed is referred to as a non-display area.

Each of the plurality of pixels PX of the display panel 110 includes at least one thin film transistor.

Further, when the display apparatus 100 according to the example embodiment of the present disclosure is an electroluminescent display apparatus, current is applied to an electroluminescent diode equipped in the plurality of pixels PX and discharged electrons and holes are coupled to generate excitons. The excitons emit light to implement a gray scale of the display apparatus 100.

The plurality of pixels PX may be sub pixels which emit different color light from each other. For example, the plurality of pixels PX may be a red sub pixel, a green sub pixel, a blue sub pixel, and a white sub pixel, but is not limited thereto. The plurality of pixels PX may configure one unit pixel. That is, the red sub pixel, the green sub pixel, the blue sub pixel, and the white sub pixel may configure one unit pixel and the display panel 110 may include a plurality of unit pixels.

However, the display apparatus 100 according to the example embodiment of the present disclosure is not limited to the electroluminescent display apparatus, but may be various types of display apparatus such as a liquid crystal display apparatus.

The gate driver 120 sequentially supplies a gate voltage of an on-voltage or an off-voltage to gate lines GL in accordance with a gate control signal output from a timing controller.

The gate control signal includes a gate start pulse, a gate shift clock, and a gate output enable signal.

The above-described gate start pulse controls an operation start timing of one or more gate circuits which configure the gate driver 120. The gate shift clock is a clock signal which is commonly input to one or more gate circuits and controls a shift timing of the scan signal (gate pulse). The gate output enable signal designates timing information of one or more gate circuits.

According to a driving method, the gate driver 120 may be located only at one side of the display panel 110 or located at both sides as needed.

The gate driver 120 may include a shift register and a level shifter. The shift register may be configured by a plurality of stages which shifts the gate signal to output, in response to the clock signal and the driving signal. The plurality of stages included in the shift register may sequentially output the gate signal through a plurality of output terminals.

The data driver 130 converts image data received from the timing controller into an analog data voltage Vdata based on the data control signal to output the converted analog type data voltage to the data line DL.

The above-described data control signal includes a source start pulse, a source sampling clock, and a source output enable signal.

The above-described source start pulse controls a data sampling start timing of one or more data circuits which configure the data driver 130. The source sampling clock is a clock signal which controls a sampling timing of data in each data circuit. The source output enable signal controls an output timing of the data driver 130.

The data driver 130 is connected to a bonding pad of the display panel 110 by a tape automated bonding method or a chip on glass method, or may be directly disposed on the display panel 110. In some embodiments, the data driver 130 may be disposed to be integrated in the display panel 110.

The data driver 130 may include a logic unit or logic circuitry including various circuits such as a level shifter or a latch unit, a digital analog converter (DAC), and an output buffer.

The power supply unit or "power supply" 140 may convert an input voltage supplied from an external system into a driving voltage beneficial to drive the display apparatus 100. For example, the power supply unit 140 may supply at least one of a reference voltage Vref, an initialization voltage (or a stabilization voltage) Vini, a high potential power voltage ELVDD, and a low potential power voltage ELVSS to the display panel 110. The reference voltage Vref is a voltage which is supplied to a pixel PX (or a pixel circuit) of the display panel and may include a voltage which is a reference for driving the pixel circuit. The reference voltage Vref has a predetermined or selected value based on an electrical characteristic of the display panel 110. The initialization voltage Vini may include a voltage which stabilizes the driving of the driving transistor.

For example, the power supply unit 140 generates a high potential power voltage ELVDD to supply the generated high potential power voltage to an electroluminescent diode (or a light emitting diode) included in each of the plurality of pixels PX (or pixel circuits). The power supply unit 140 generates a low potential power voltage ELVSS to supply the generated low potential power voltage to an electroluminescent diode (or a light emitting diode) included in each of the plurality of pixels PX (or pixel circuits).

Figure 2:
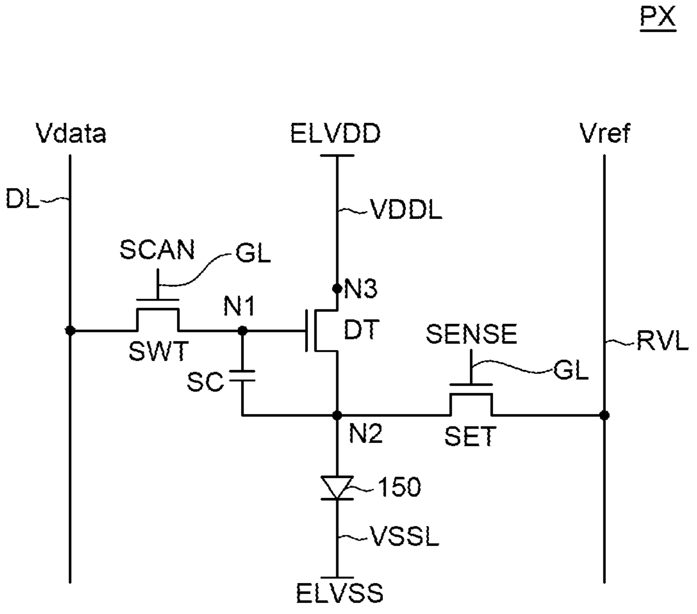
FIG. 2 is an example of a pixel circuit of a display apparatus according to an example embodiment of the present disclosure.

FIG. 2 is a circuit diagram of a pixel of a display apparatus according to an example embodiment of the present disclosure.

FIG. 2 illustrates a circuit diagram for one pixel among a plurality of pixels of the display apparatus 100.

Referring to FIG. 2, the pixel may include a switching transistor SWT, a sensing transistor SET, a driving transistor DT, a storage capacitor SC, and a light emitting diode 150.

The light emitting diode 150 may include an anode, an organic layer, and a cathode. The organic layer may include various organic layers such as a hole injection layer, a hole transport layer, an organic light emitting layer, an electron transport layer, and an electron injection layer. The anode of the light emitting diode 150 may be connected to an output terminal of the driving transistor DT, and a low potential power voltage ELVSS may be applied to the cathode through the low potential voltage line VSSL. Even though in FIG. 2, it is described that the light emitting diode 150 is an organic light emitting diode, the present disclosure is not limited thereto so that as the light emitting diode 150, an inorganic light emitting diode, that is, an LED may also be used.

The above-described low potential voltage line VSSL is a constant voltage line which applies a low potential power voltage ELVSS which is a constant power source and may be denoted as a ground terminal.

Referring to FIG. 2, the switching transistor SWT is a transistor which transmits the data voltage Vdata to a first node N1 corresponding to a gate electrode of the driving transistor DT. The switching transistor SWT may include a drain electrode connected to the data line DL, a gate electrode connected to the gate line GL, and a source electrode connected to the gate electrode of the driving transistor DT. The switching transistor SWT is turned on by a scan signal SCAN applied from the gate line GL to transmit a data voltage Vdata supplied from the data line DL to the first node N1 corresponding to the gate electrode of the driving transistor DT.

Referring to FIG. 2, the driving transistor DT is a transistor which supplies a driving current to the light emitting diode 150 to drive the light emitting diode 150. The driving transistor DT may include a gate electrode corresponding to the first node N1, a source electrode corresponding to a second node N2 and an output terminal, and a drain electrode corresponding to a third node N3 and an input terminal. The gate electrode of the driving transistor DT is connected to the switching transistor SWT, the drain electrode is applied with a high potential power voltage ELVDD by means of a high potential voltage line VDDL, and the source electrode may be connected to the anode of the light emitting diode 150.

Referring to FIG. 2, the storage capacitor SC is a capacitor which maintains a voltage corresponding to the data voltage Vdata for one frame. One electrode of the storage capacitor SC is connected to the first node N1 and the other electrode may be connected to the second node N2.

In the meantime, in the case of the display apparatus 100, as the driving time of each pixel is increased, the circuit element such as the driving transistor DT may be degraded. Accordingly, a unique characteristic value of the circuit element such as a driving transistor DT may be changed. Here, the unique characteristic value of the circuit element may include a threshold voltage Vth of the driving transistor DT or a mobility a of the driving transistor DT. The change in the characteristic value of the circuit element may cause a luminance change of the corresponding pixel. Accordingly, the change in the characteristic value of the circuit element may be used as the same concept as the luminance change of the pixel.

Further, the degree of the change in the characteristic values between circuit elements of each pixel may vary depending on a degree of degradation of each circuit element. Such a difference in the changing degree of the characteristic values between the circuit elements may cause a luminance deviation between the pixels. Accordingly, the characteristic value deviation between circuit elements may be used as the same concept as the luminance deviation between the pixels. The change in the characteristic values of the circuit elements, that is, the luminance change of the pixel and the characteristic value deviation between the circuit elements, that is, the luminance deviation between the pixels may cause problems such as the lowering of the accuracy for luminance expressiveness of the pixel or causing the screen abnormality.

Therefore, the pixel of the display apparatus 100 according to the example embodiment of the present disclosure may provide a sensing function of sensing a characteristic value for the pixel and a compensating function of compensating for the characteristic value of the pixel using the sensing result.

The display apparatus 100 according to the example embodiment of the present disclosure controls a current value for sensing according to a temperature of the display apparatus 100 to perform more precise sensing. Accordingly, an effect of the compensation function using the sensing result is increased to improve the quality of the display apparatus 100.

According to the example embodiment, the pixel may further include a sensing transistor SET to effectively control a voltage state of the source electrode of the driving transistor DT, in addition to the switching transistor SWT, the driving transistor DT, the storage capacitor SC, and the light emitting diode 150.

Referring to FIG. 2, the sensing transistor SET is connected between the source electrode of the driving transistor DT and the reference voltage line RVL which supplies a reference voltage Vref, and a gate electrode is connected to the gate line GL. Therefore, the sensing transistor SET is turned on by the sensing signal SENSE applied through the gate line GL to apply the reference voltage Vref which is supplied through the reference voltage line RVL to the source electrode of the driving transistor DT. Further, the sensing transistor SET may be utilized as one of voltage sensing paths for the source electrode of the driving transistor DT.

Referring to FIG. 2, the switching transistor SWT and the sensing transistor SET of the pixel may share one gate line GL. That is, the switching transistor SWT and the sensing transistor SET are connected to the same gate line GL to be applied with the same gate signal. However, for the convenience of description, a voltage which is applied to the gate electrode of the switching transistor SWT is referred to as a scan signal SCAN and a voltage which is applied to the gate electrode of the sensing transistor SET is referred to as a sensing signal SENSE. However, the scan signal SCAN and the sensing signal SENSE applied to one pixel are the same signal which is transmitted from the same gate line GL.

However, the present disclosure is not limited thereto so that only the switching transistor SWT is connected to the gate line GL and the sensing transistor SET may be connected to a separate sensing line. Therefore, the scan signal SCAN may be applied to the switching transistor SWT through the gate line GL, and the sensing signal SENSE may be applied to the sensing transistor SET through the sensing line.

Accordingly, the reference voltage Vref is applied to the source electrode of the driving transistor DT by means of the sensing transistor SET. Further, a sensing voltage for sensing the threshold voltage Vth of the driving transistor DT or the mobility a of the driving transistor DT is detected by the reference voltage line RVL. Further, the data driver 130 may compensate for the data voltage Vdata in accordance with a variation of the threshold voltage Vth of the driving transistor DT or the mobility a of the driving transistor DT.

According to the example embodiment, the sensing transistor SET may be omitted. In this case, the second node N2 may be sensed using various methods which may be understood by those skilled in the art.

Figure 3:
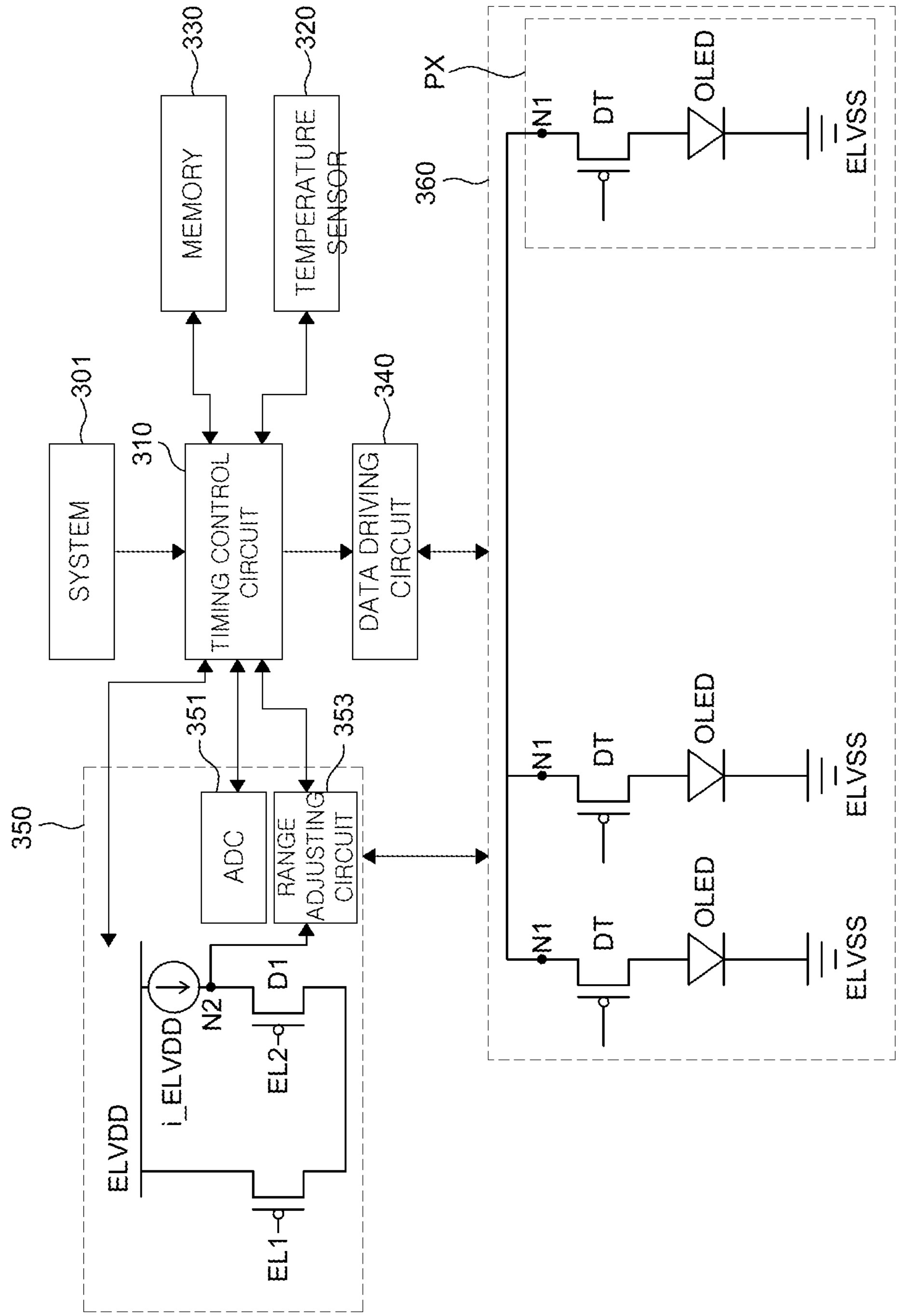
FIG. 3 is a conceptual diagram for describing a display apparatus according to an example embodiment of the present disclosure.

FIG. 3 is a conceptual diagram for describing a display apparatus according to an example embodiment of the present disclosure. Specifically, FIG. 3 illustrates a block diagram of a display apparatus and some blocks are illustrated in a specific circuit conceptual view. However, this is just an example for the convenience of description, but the present disclosure is not limited to this example.

The display apparatus may include a timing control circuit 310, a temperature sensor 320, a memory 330, a data driving circuit 340, a sensing circuit 350, and a display panel 360. Components included in the display apparatus may be electrically connected to each other. Some of the components may transmit and receive signals related to the driving of the display apparatus based on the connection.

According to the example embodiment, the display apparatus may be electrically connected to the system 301. The system 301 may be disposed at the outside of the display apparatus. However, the present disclosure is not limited thereto and according to the example embodiment, the display apparatus may be implemented to include a system 301.

According to the example embodiment, at least one of the timing control circuit 310, the sensing circuit 350, and the data driving circuit 340 may be referred to as a control circuit. For example, the control circuit is implemented to include the timing control circuit 310 and the sensing circuit 350 so that the timing control circuit 310 and the sensing circuit 350 may be referred to as a control circuit. For another example, the control circuit is implemented to include the timing control circuit 310, the sensing circuit 350, and the data driving circuit 340 so that the timing control circuit 310, the sensing circuit 350, and the data driving circuit 340 may be referred to as a control circuit.

According to the example embodiment, the timing control circuit 310, the sensing circuit 350, and the data driving circuit 340 may be functionally classified, and a subject of each operation of the timing control circuit 310, the sensing circuit 350, and the data driving circuit 340, which will be described later, may be flexibly changed. For example, an operation of each of the timing control circuit 310, the sensing circuit 350, and the data driving circuit 340 may be performed by the control circuit, but the example embodiments of the present disclosure are not limited by those referred to.

According to the example embodiment, the memory 330 stores various data related to the display apparatus. For example, the memory 330 may store data about a current value for compensating for a pixel PX for every temperature related to the display apparatus. For example, the memory 330 may store data about a first current value corresponding to a first temperature, and data about a second current value corresponding to a second temperature. For another example, the memory 330 may store data about a first current value corresponding to a first temperature range, and data about a second current value corresponding to a second temperature range. Here, the first temperature, the first temperature range, the second temperature, and the second temperature range may relate to a temperature for the display apparatus, and for example, a temperature of at least a part of the display apparatus measured by the temperature sensor 320 to be described below.

The memory 330 may be connected to the timing control circuit 310. For example, the memory 330 may be electrically connected to the timing control circuit 310. The timing control circuit 310 may identify (or read) information stored in the memory 330 based on the connection with the memory 330.

According to the example embodiment, the memory 330 may include a non-volatile memory. In this case, the memory 330 may hold the information even though the power is cut. When the power is supplied to the memory 330 again, data stored in the memory 330 may be provided to a device connected to the memory 330, for example, the timing control circuit 310. For example, the memory 330 may include an electrical erasable programmable read only memory (EEPROM), but is not limited thereto.

According to the example embodiment, the temperature sensor 320 may sense (or measure) a temperature related to the display apparatus. For example, a temperature related to the display apparatus may include at least one of a temperature of the display apparatus, a temperature of a region in the display apparatus in which the temperature sensor 320 is disposed, and a temperature of the display panel 360.

The display apparatus may be divided into a display area (or an active area) in which a pixel PX is disposed to emit light and a non-display area (or a non-active area) in which the light is not emitted. The non-display area may include a bezel area at an outer periphery of the pixel PX and a PCB area in which a driving circuit, such as a timing control circuit 310, is disposed.

According to the example embodiment, the temperature sensor 320 may be disposed in the display area. In this case, a temperature measured by the temperature sensor 320 may be a temperature of the display area. According to another example embodiment, the temperature sensor 320 is disposed in the non-display area. In this case, a temperature measured by the temperature sensor 320 may be a temperature of the non-display area. The non-display area and the display area are adjacent to each other so that an error range caused by the placement of the temperature sensor 320 may be approximately 1° C., which does not cause any problem related to a compensation operation to be described below.

According to the example embodiment, the temperature sensor 320 may be connected to the timing control circuit 310. For example, the temperature sensor 320 may be electrically connected to the timing control circuit 310. The temperature sensor 320 may provide sensed temperature information to the timing control circuit 310.

According to the example embodiment, an operation of sensing a temperature by the temperature sensor 320 may be performed when a specific input is provided. For example, the temperature sensor 320 may be provided with a compensation input signal generated when an accumulated driving time of the display panel 360 is equal to or higher than a first time. The temperature sensor 320 may sense the temperature when a compensation input signal is provided. Here, the first time is a predetermined or selected time, and for example, may include 900 hours, but is not limited thereto.

According to the example embodiment, the timing control circuit 310 may receive timing signals such as a vertical synchronization signal, a horizontal synchronization signal, a data enable signal, or a dot clock from the system 301, by means of a receiving circuit such as an LVDS or TMDS interface connected to a system 301. The timing control circuit 310 may generate a data control signal to control the data driving circuit 340 and gate control signals to control the gate driving circuit, based on the input timing signal.

Here, the data driving circuit 340 corresponds to the data driver 130 of FIG. 1, and the gate driving circuit may correspond to the gate driver 120 of FIG. 1. In FIG. 3, the gate driving circuit is omitted for the convenience of description.

The timing control circuit 310 processes image data input from the outside to be convert into image data appropriate for a size and a resolution of the display panel 360 and then provide the converted image data to the data driving circuit 340. The data driving circuit 340 may provide the converted image data to the display panel 360. For example, the data driving circuit 340 provides the converted image data to a pixel PX included in the display panel 360 to display the image data.

According to the example embodiment, the timing control circuit 310 senses a characteristic value (a mobility and a threshold voltage) of a driving transistor disposed in the plurality of pixels PX to generate compensation data for the characteristic value (a mobility and a threshold voltage) of the driving transistor. The timing control circuit 310 may compensate for image data using compensation data. When the compensation operation is performed, the timing control circuit 310 may provide the compensated image data to the data driving circuit 340. The data driving circuit 340 may provide the compensated image data to the display panel 360. For example, the data driving circuit 340 provides the compensated image data to a pixel PX included in the display panel 360 to display the image data.

According to the example embodiment, when the temperature sensed by the temperature sensor 320 corresponds to the first temperature (or the first temperature range), the timing control circuit 310 may identify a threshold voltage of a driving transistor using a first current value. When the temperature sensed by the temperature sensor corresponds to the second temperature (or the second temperature range), the timing control circuit 310 may identify a threshold voltage using a second current value.

According to the example embodiment, the timing control circuit 310 may identify a temperature (hereinafter, a sensing temperature) related to the display apparatus sensed by the temperature sensor 320, based on the connection of the temperature sensor 320. The timing control circuit 310 may identify which temperature of the first temperature and the second temperature corresponds to the sensed temperature. Here, information about the first temperature and the second temperature may be identified from the memory 330 by the timing control circuit 310. For example, the timing control circuit 310 may identify information about the first temperature, the second temperature, a current value corresponding to the first temperature, and a current value corresponding to the second temperature from the memory 330. Accordingly, the timing control circuit 310 may identify which temperature of the first temperature and the second temperature corresponds to the sensed temperature.

According to the example embodiment, the timing control circuit 310 may identify which temperature range of the first temperature range and the second temperature range corresponds to the sensed temperature. For example, the timing control circuit 310 may identify whether a value of the sensing temperature is included in the first temperature range or the second temperature range. Here, information about the first temperature range and the second temperature range may be identified from the memory 330 by the timing control circuit 310. The timing control circuit 310 may identify information about the first temperature range, the second temperature range, a current value corresponding to the first temperature range, and a current value corresponding to the second temperature range from the memory 330.

According to the example embodiment, the timing control circuit 310 may input one of the first current value and the second current value and predetermined or selected image data to each of the at least one pixel circuit.

According to the example embodiment, the timing control circuit 310 may input one of the first current value and the second current value to each of the at least one pixel circuit included in the display panel 360. The pixel circuit is a circuit which configures a pixel PX, and at least one pixel circuit may correspond to a pixel circuit corresponding to every pixel PX of FIG. 3. The timing control circuit 310 may input a current value identified by the sensing temperature to at least one pixel circuit. Hereinafter, in the present disclosure, the pixel PX is understood as a term corresponding to the pixel circuit, but the example embodiment is not limited.

For example, the timing control circuit 310 may provide the current value through a path through which the high potential power voltage ELVDD is provided. For example, the timing control circuit 310 may provide the identified current value, that is, a current value of the first current value and the second current value corresponding to a sensing temperature to the pixel circuit through a wiring line through which the high potential power voltage ELVDD is provided. As another example, the timing control circuit 310 may provide the current value to a first node N1 of the pixel circuit of the display panel 360 from a current source i_ELVDD via the compensation transistor D1. The first node N1 may correspond to a node to which the high potential power voltage ELVDD of the pixel circuit is input.

According to the example embodiment, the timing control circuit 310 may input predetermined or selected image data to each of at least one pixel circuit. For example, the timing control circuit 310 may input predetermined or selected image data to at least one pixel circuit through the data driving circuit 340. The predetermined or selected image data may be stored in advance to be used to identify degradation for every pixel PX. The image data may be stored in the memory 330 and the timing control circuit 310 reads the image data based on the connection to the memory 330 to input the image data to at least one pixel circuit through the data driving circuit 340.

In the example embodiment, the timing control circuit 310 may identify a threshold voltage of at least one pixel circuit (or a pixel PX) and whether at least one pixel circuit is degraded. The timing control circuit 310 may identify a threshold voltage of a driving transistor DT of at least one pixel circuit (or a pixel PX) and whether at least one pixel circuit is degraded. The threshold voltage and whether at least one pixel circuit is degraded may be identified using the sensing circuit 350 to be described below, but are not limited thereto.

In one example embodiment, the timing control circuit 310 inputs the identified current value to the first node N1 and may input the image data (or the data voltage Vdata of FIG. 2) to the data voltage line. The timing control circuit 310 may identify a threshold voltage (or a threshold voltage of the driving transistor DT) for every pixel PX based on the identified current value and the input image data.

According to the example embodiment, the timing control circuit 310 may identify whether to be degraded, according to a voltage value of the threshold voltage. For example, when a difference between a threshold voltage value and a predetermined or selected voltage value is equal to or higher than a first value, the timing control circuit 310 considers that the pixel PX (or a light emitting diode OLED included in the pixel PX) is degraded. For example, when a difference between a threshold voltage value and a predetermined or selected voltage value is lower than the first value, the timing control circuit 310 considers that the pixel PX is not degraded. An area in which a degraded pixel is disposed is classified as a degraded area and an area in which a non-degraded pixel is disposed may be classified as a normal area (or a non-degraded area).

According to the example embodiment, when an accumulated driving time of the display panel 360 is equal to or longer than a first time, the timing control circuit 310 may identify a threshold voltage of at least one pixel circuit and whether at least one pixel circuit is degraded. For example, when an accumulated driving time of the display panel 360 is equal to or longer than a first time, for example, 900 hours, the timing control circuit 310 may identify a threshold voltage of at least one pixel circuit and whether at least one pixel circuit is degraded. The threshold voltage and whether at least one pixel circuit is degraded may be identified using the sensing circuit 350 to be described below, but are not limited thereto.

For example, the timing control circuit 310 may store the information about the driving time in the memory 330 according to the driving of the display panel 360. The timing control circuit 310 may periodically identify an accumulated driving time of the display panel 360. When the accumulated driving time is a first time or longer, the timing control circuit 310 may identify the threshold voltage of each of at least one pixel circuit and whether at least one pixel circuit is degraded, using the sensing circuit 350 and the data driving circuit 340.

According to the example embodiment, the timing control circuit 310 may identify one or more light emitting diodes (OLED) corresponding to a degraded area and one or more light emitting diodes (OLED) corresponding to a normal area, based on whether to be degraded. For example, the timing control circuit 310 may consider the light emitting diode (OLED) disposed in each pixel which is identified to be degraded as one or more light emitting diodes (OLED) corresponding to the degraded area. The timing control circuit 310 may consider the light emitting diode (OLED) disposed in each pixel which is not degraded (or a pixel other than the degraded pixel) as one or more light emitting diodes (OLED) corresponding to the normal area.

A first electrode of the light emitting diode may be connected to the driving transistor. The second electrode of the light emitting diode may be connected to the low potential voltage line which provides a low potential power voltage ELVSS. The first electrode corresponds to an anode electrode and the second electrode may correspond to a cathode electrode, but are not limited thereto.

In the example embodiment, the timing control circuit 310 may identify whether the pixel PX of the display panel 360 is degraded based on the connection with the sensing circuit 350. For example, the timing control circuit 310 may provide a current value corresponding to a temperature identified according to the sensing temperature to the pixel PX through the sensing circuit 350. The sensing circuit 350 may sense a threshold voltage of the pixel PX based on a current value which is provided to the pixel PX. The timing control circuit 310 is provided with a value of the sensed threshold voltage from the sensing circuit 350 to identify the threshold voltage of the pixel PX.

According to the example embodiment, the timing control circuit 310 may identify a first average threshold voltage of one or more light emitting diodes corresponding to the degraded area and a second average threshold voltage of one or more light emitting diodes corresponding to the normal area. For example, the timing control circuit 310 may identify an average of threshold voltages of one or more light emitting diodes corresponding to the degraded area as the first average threshold voltage. The timing control circuit 310 may identify an average of threshold voltages of one or more more light emitting diodes corresponding to the normal area as the second average threshold voltage.

According to the example embodiment, the timing control circuit 310 may compensate for the display panel using a difference between the first average threshold voltage and the second average threshold voltage. For example, the timing control circuit 310 may perform a compensation operation on one or more light emitting diodes corresponding to the degraded area to reduce the threshold voltage by a difference of the first average threshold voltage and the second average threshold voltage. In this case, the degradation of each of one or more light emitting diodes corresponding to the degraded area is compensated to allow the display panel to evenly emit light. By doing this, the visibility of the display panel is improved to enhance a quality of the display panel.

According to the example embodiment, the sensing circuit 350 may include a converter circuit 351 which converts an analog electric signal into a digital electric signal and a range adjusting circuit 353 which adjusts a conversion data range of the converter circuit 351 according to a temperature. The sensing circuit 350 may sense a threshold voltage of the pixel PX using at least one of the converter circuit 351 and the range adjusting circuit 353.

According to the example embodiment, when the sensing circuit 350 receives an input related to the performing of the compensation operation from the timing control circuit 310, the sensing circuit may provide a current for sensing a threshold voltage to the pixel PX. The sensing circuit 350 may sense a threshold voltage of the pixel PX as a feedback for the provided current. At this time, the sensed threshold voltage may be analog data. In this case, the sensing circuit 350 may convert analog data into digital data using the converter circuit 351. The sensing circuit 350 may provide the converted digital data to the timing control circuit 310.

According to the example embodiment, the range adjusting circuit 353 may change a sensing range of the threshold voltage according to the temperature. The range adjusting circuit 353 may identify which of the first temperature (or the first temperature range) or the second temperature (or the second temperature range) corresponds to a temperature sensed by the temperature sensor 320 by identifying the current value of the second node N2. In some cases, the range adjusting circuit 533 may identify information about the temperature sensed by the temperature sensor 320 from the timing control circuit 310.

For example, the range adjusting circuit 353 may set the converted data range of the converter circuit 351 to a first range in response to the fact that the temperature sensed by the temperature sensor 320 is a first temperature. The range adjusting circuit 353 may set the converted data range of the converter circuit 351 to a second range in response to the fact that the temperature sensed by the temperature sensor 320 is a second temperature. Here, the first temperature corresponds to a temperature range higher than a room temperature, for example, 37° C. to 45° C., and the second temperature may correspond to the room temperature, for example, 20° C. to 27° C. The first range may be a range including a voltage value lower than a voltage value of the second range. However, this is just an example, so that the example embodiment of the present disclosure is not limited thereto.

As another example, the range adjusting circuit 353 may set the converted data range of the converter circuit 351 to a first range in response to the fact that the temperature sensed by the temperature sensor 320 is included in a first temperature range. The range adjusting circuit 353 may set the converted data range of the converter circuit 351 to a second range in response to the fact that the temperature sensed by the temperature sensor 320 is included in a second temperature range. Here, the first temperature range is a temperature range higher than a room temperature, for example, 37° C. to 45° C. and the second temperature range may be a temperature range of the room temperature, for example, 20° C. to 27° C. The first range may be a range including a voltage value lower than a voltage value of the second range.

According to the example embodiment, at least one of the converter circuit 351 and the range adjusting circuit 353 may be separately provided from the sensing circuit 350. FIG. 3 is for the convenience of description but the example embodiment of the present disclosure is not limited to FIG. 3. At least one of the converter circuit 351 and the range adjusting circuit 353 may be driven based on the control of the timing control circuit 310, but are not limited thereto.

According to the example embodiment, the data driving circuit 340 may be connected to the timing control circuit 310. For example, the data driving circuit 340 may be electrically connected to the timing control circuit 310. The data driving circuit 340 is supplied with image data from the timing control circuit 310 to supply a data voltage corresponding to the image data to the display panel 360. The data driving circuit 340 may be connected to the pixel PX disposed in the display panel 360. The data driving circuit 340 may supply a data voltage to each pixel PX based on the connection of the pixel PX.

According to the example embodiment, the display panel 360 may include at least one pixel circuit. At least one pixel circuit may include a light emitting diode and a driving transistor. The driving transistor may be connected to the light emitting diode. The light emitting diode may emit light based on the connection with the driving transistor. In the meantime, as the driving time is increased, the light emitting diode may be degraded. In this case, a quality problem, such as degradation of a visibility of a display quality of the display panel 360 may be caused, and the display apparatus of the present disclosure may suppress the degradation of the display quality by the compensation operation.

Figure 4:
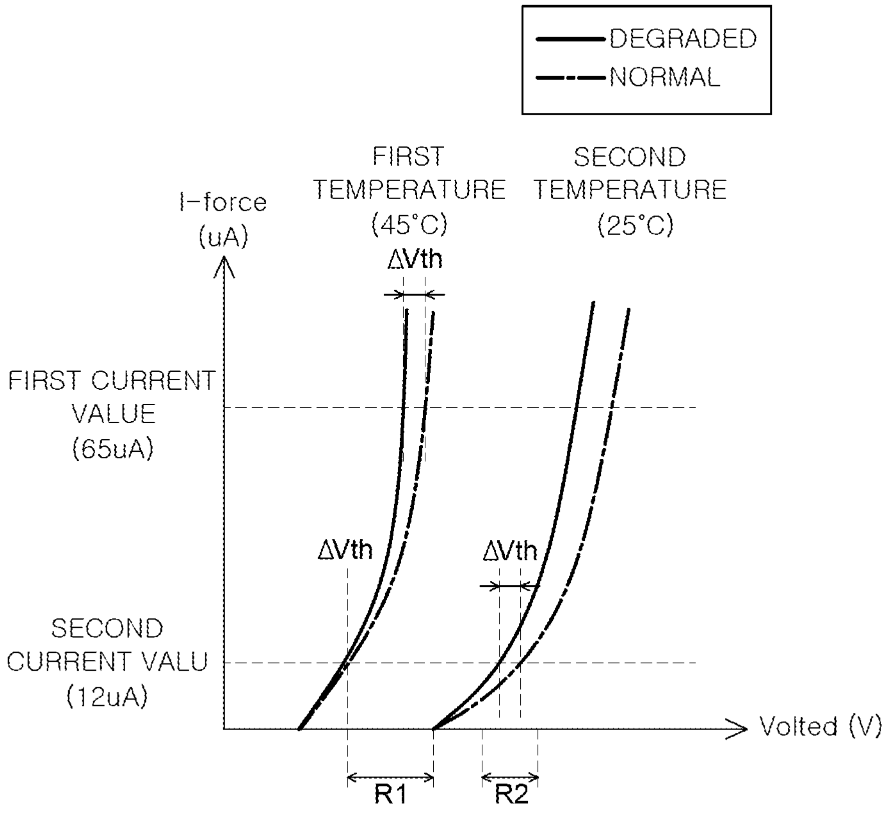
FIG. 4 is a view for explaining an operation of a display apparatus according to an example embodiment of the present disclosure.

FIG. 4 is a view for explaining an operation of a display apparatus according to an example embodiment of the present disclosure. FIG. 4 is a graph for explaining a current value and a conversion data range for identifying a temperature and a threshold voltage of the display apparatus.

Referring to FIG. 4, an x-axis (Volted (V)) indicates a value of the threshold voltage, and a y-axis (I-force (uA)) indicates a current value input to a pixel to identify the threshold voltage. A temperature sensed by the temperature sensor, for example, a temperature of the display apparatus may be represented as a first temperature or a second temperature. For example, the first temperature may be a high temperature or 45° C., and the second temperature may be the room temperature or 25° C.

In FIG. 4, a current value which is designated in advance to correspond to the first temperature to measure a threshold voltage is a first current value, for example, 62 uA, and a current value which is designated in advance to correspond to the second temperature may be a second current value, for example, 12 uA. On the graph, a dotted line indicates an average threshold voltage of a degraded area of the display panel, and a solid line may indicate an average threshold voltage of a normal area of the display panel.

Referring to FIG. 4, regardless of the temperature, the same voltage value, for example, the second current value is used to measure a threshold voltage, at a high temperature, for example, at the first temperature, a difference ΔVth of the average threshold voltages Vth between the degraded area and the normal area may be not clear.

The display apparatus according to the example embodiment of the present disclosure may identify the average threshold voltages Vth and a difference ΔVth of the average threshold voltages between the degraded area and the normal area using an appropriate current value for every temperature, for example, each of the first temperature and the second temperature. For example, the display apparatus may identify the average threshold voltage and the difference of the average threshold voltages between the degraded area and the normal area, using the first current value at the first temperature and the second current value at the second temperature.

According to the example embodiment, the display apparatus sets a conversion data range of the converter circuit to the first conversion data range R1 at the first temperature, and may set the conversion data range to the second conversion data range R2 at the second temperature. The conversion data range may include a range of data used to convert analog data, for example, a threshold voltage, to digital data.

The display apparatus according to the example embodiment of the present disclosure may improve an operation efficiency of the converter circuit using a conversion data range appropriate for every temperature. Further, a storage capacity related to the converter circuit may be ensured by suppressing the storage of a range of unnecessary conversion data. The storage capacity related to the converter circuit may include a storage capacity of the memory or a storage capacity of the converter circuit itself, but is not limited thereto.

A numerical value mentioned in FIG. 4 is just an example, but is not limited thereto.

Figure 5:
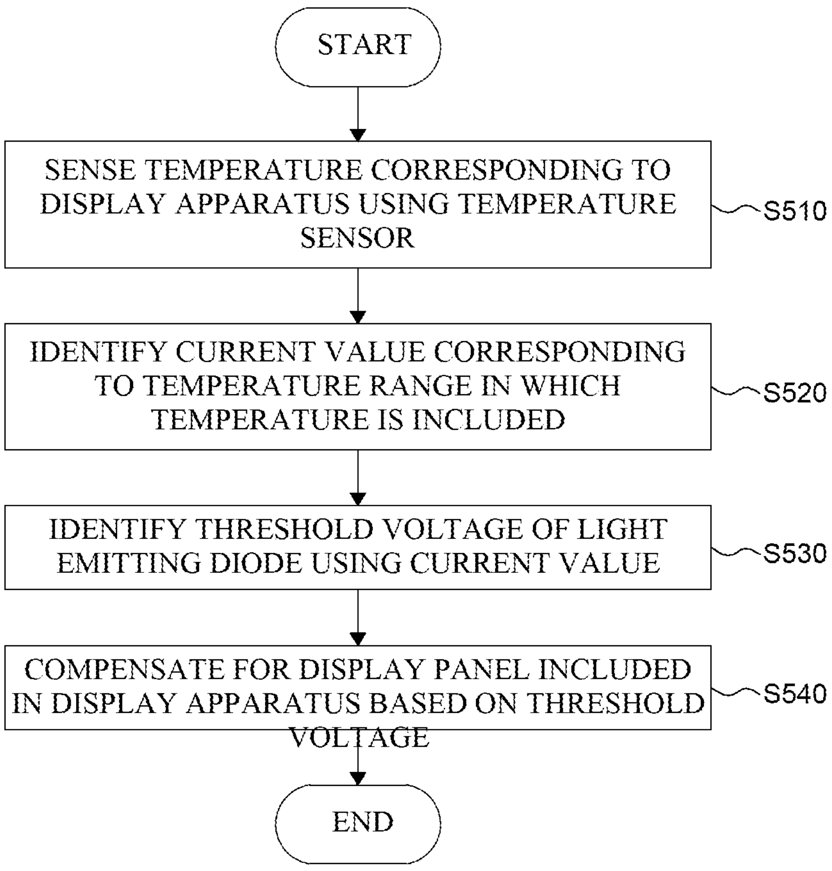
FIG. 5 is a flowchart of an operating method of a display apparatus according to an example embodiment of the present disclosure.

FIG. 5 is a flowchart of an operating method of a display apparatus according to an example embodiment of the present disclosure. FIG. 5 represents each step of an operating method of a display apparatus. An additional step may be further included between at least some of steps of FIG. 5 and some steps may be omitted. Further, according to the example embodiment, at least some steps may be performed in different orders.

Referring to FIG. 5, in step S510, a display apparatus (or a control circuit) may sense a temperature corresponding to the display apparatus using a temperature sensor. The display apparatus may include a temperature sensor and sense the temperature using the temperature sensor. The temperature sensed by the temperature sensor may include a temperature of the display apparatus.

In step S520, the display apparatus (or the control circuit) may identify a current value corresponding to a temperature range including a temperature. The current value is designated in advance according to the temperature range to be stored in the memory of the display apparatus. The display apparatus may identify a temperature range including a temperature sensed by the temperature sensor. The display apparatus may identify a current value which is designated in advance corresponding to the identified temperature range.

For example, when the temperature is included in the first temperature range, the display apparatus may identify a first current value. When the temperature is included in the second temperature range, the display apparatus may identify a second current value. The first current value may be larger than the second current value. The first temperature range may be higher than the second temperature range. For example, the first temperature range may include a high temperature or a temperature range of 37° C. or higher. The second temperature range may include the room temperature or a temperature range lower than 37° C.

In step S530, the display apparatus (or the control circuit) may identify the threshold voltage of the light emitting diode using the current value. The display apparatus supplies a current value to at least one pixel circuit (or a pixel) of the display panel to identify the threshold voltage of each pixel circuit. The display apparatus may identify whether at least one pixel circuit is included in any area among the degraded area or the normal area, based on the identified threshold voltage.

For example, when the value of the identified threshold voltage is lower than a predetermined or selected value, the display apparatus may identify a pixel circuit corresponding to the identified threshold voltage as the normal area. When the value of the identified threshold voltage is equal to or higher than the predetermined or selected value, the display apparatus may identify a pixel circuit corresponding to the identified threshold voltage as the degraded area. The display apparatus identifies a first average threshold voltage of the pixel circuit corresponding to the degraded are, and may identify a second average threshold voltage of the pixel circuit corresponding to a normal area. The step S530 will be described in more detail with reference to FIG. 6.

In step S540, the display apparatus (or the control circuit) may compensate for the display panel included in the display apparatus based on the threshold voltage. The display apparatus may compensate for the pixel circuit to alleviate the difference between the threshold voltage of the normal area and the threshold voltage of the degraded area.

According to the example embodiment, when the identified threshold voltage is the first average threshold voltage and the second average threshold voltage, the display apparatus may compensate for the display panel using the difference between the first average threshold voltage and the second average threshold voltage. For example, the display apparatus may control the threshold voltage of the pixel circuit corresponding to the degraded area so as to lower the value of the threshold voltage of the degraded area by the difference.

Figure 6:
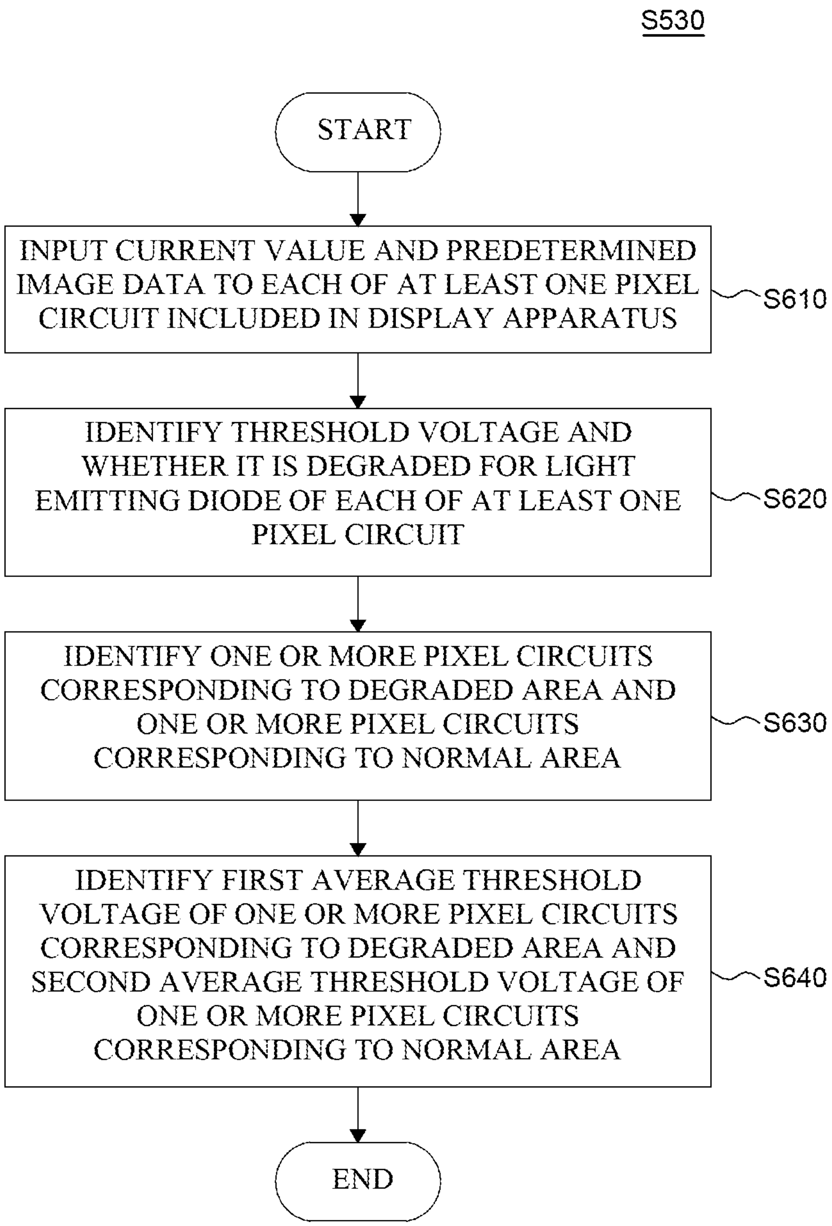
FIG. 6 is a flowchart of specifying a part of an operating method of a display apparatus according to an example embodiment of the present disclosure.

FIG. 6 is a flowchart of specifying a part of an operating method of a display apparatus according to an example embodiment of the present disclosure. FIG. 6 is a flowchart of specifically illustrating the step S530 of FIG. 5.

Referring to FIG. 6, in step S610, the display apparatus may input the identified current value and predetermined or selected image data to at least one pixel circuit. The display apparatus may input a current corresponding to the identified current value to the pixel circuit using the sensing circuit. A node of the pixel circuit to which the current is input may correspond to a node to which a high potential power voltage is input. The display apparatus may input image data to each of the pixel circuits using the data driving circuit. The image data may be input to the pixel circuit as a data voltage.

In step S620, the display apparatus may identify a threshold voltage of at least one pixel circuit and whether at least one pixel circuit is degraded. Here, the threshold voltage may be a threshold voltage of the driving transistor of the pixel circuit. The display apparatus may identify the threshold voltage of each pixel circuit based on a current and a data voltage input to the pixel circuit.

According to the example embodiment, when the temperature is included in the first temperature range, the display apparatus may set a conversion data range of the converter circuit included in the display apparatus to the first range. When the temperature is included in the second temperature range, the display apparatus may set the conversion data range to the second range. The first temperature range may correspond to a range including a temperature higher than the second temperature range. The first range may be a range including a voltage value lower than a voltage value of the second range. The conversion data range may include a data range for converting the identified threshold voltage from analog data into digital data. The display apparatus may identify the threshold voltage value based on the conversion to the digital data, and then identify whether to be degraded.

According to the example embodiment, when the threshold voltage value is lower than a predetermined or selected value, the display apparatus may identify that the pixel circuit is not degraded. The pixel circuit which is not degraded may be included in the normal area. When the threshold voltage value is higher than a predetermined or selected value, the display apparatus may identify that the pixel circuit is degraded. The pixel circuit which is degraded may be included in the degraded area.

In step S630, the display apparatus may identify one or more pixel circuits corresponding to the degraded area and one or more pixel circuits corresponding to the normal area based on whether to be degraded.

In step S640, the display apparatus may identify a first average threshold voltage of one or more pixel circuits corresponding to the degraded area and a second average threshold voltage of one or more pixel circuits corresponding to the normal area. The display apparatus may identify an average of the threshold voltage of each of one or more pixel circuits corresponding to the degraded area. The display apparatus may identify an average of the threshold voltage of each of one or more pixel circuits corresponding to the normal area.

The example embodiments of the present disclosure can also be described as follows:

According to an aspect of the present disclosure, a display apparatus may include a display panel in which a pixel circuit including a light emitting diode and a driving transistor connected to the light emitting diode is disposed; a memory configured to store a first current value corresponding to a first temperature and a second current value corresponding to a second temperature; a temperature sensor; and a control circuit configured to identify a threshold voltage of the light emitting diode using the first current value when a temperature sensed by the temperature sensor corresponds to the first temperature, and identifies the threshold voltage of the light emitting diode using the second current value when the temperature sensed by the temperature sensor corresponds to the second temperature.

The control circuit may input one of the first current value and the second current value and predetermined or selected image data to the at least one pixel circuit, and identify a threshold voltage and whether the pixel circuit is degraded for the at least one pixel circuit.

The control circuit may identify one or more light emitting diodes corresponding to a degraded area and one or more light emitting diodes corresponding to a normal area based on whether the pixel circuit is degraded.

The control circuit may identify a first average threshold voltage of one or more light emitting diode corresponding to the degraded area, and a second average threshold voltage of one or more light emitting diode corresponding to the normal area.

The control circuit may compensate for the display panel using a difference of the first average threshold voltage and the second average threshold voltage.

The control circuit may include a sensing circuit including a converter circuit which converts an analog electric signal into a digital electric signal and a range adjusting circuit which adjusts a conversion data range of the converter circuit; and a timing control circuit.

The control circuits may set a conversion data range of the converter circuit to a first range in response to the first temperature, and a conversion data range of the converter circuit to a second range in response to the second temperature.

The first range may be a range including a voltage value lower than a voltage value of the second range.

The first temperature corresponds to a temperature range higher than a room temperature, and the second temperature corresponds to the room temperature range.

When an accumulated driving time of the display panel is equal to or longer than a first time, the control circuit may identify the threshold voltage of the at least one pixel circuit and whether the at least one pixel circuit is degraded.

The memory may include a non-volatile memory.

According to an aspect of the present disclosure, an operating method of a display apparatus may include sensing a temperature corresponding to the display apparatus using a temperature sensor; identifying a current value corresponding to a temperature range in which the temperature is included; identifying a threshold voltage of a light emitting diode using the current value; and compensating a display panel included in the display apparatus based on the threshold voltage.

When the temperature is included in a first temperature range, the current value may correspond to a first current value and when the temperature is included in a second temperature range, the current value may correspond to a second current value, and the first current value is larger than the second current value, and the first temperature range is higher than the second temperature range.

The identifying of the threshold voltage may include inputting the current value and predetermined or selected image data to at least one pixel circuit included in the display apparatus; and identifying a threshold voltage of each of the at least one pixel circuit and whether the at least one pixel circuit is degraded.

The operating method may comprise identifying one or more pixel circuits corresponding to a degraded area and one or more pixel circuits corresponding to a normal area, based on whether the at least one pixel circuit is degraded; and identifying a first average threshold voltage of one or more pixel circuits corresponding to the degraded area and a second average threshold voltage of one or more pixel circuits corresponding to the normal area.

The compensating may include compensating for the display panel using a difference of the first average threshold voltage and the second average threshold voltage.

The operating method may further comprise setting a conversion data range of a converter circuit included in the display apparatus to a first range when the temperature is included in the first temperature range, and setting the conversion data range to a second range when the temperature is included in the second temperature range.

The first range may be a range including a voltage value lower than a voltage value of the second range.

The sensing of a temperature may perform sensing the temperature using the temperature sensor when an accumulated driving time of the display panel is equal to or longer than a first time.

A current value corresponding to a temperature range in which the temperature may be included is stored in a memory of the display apparatus, and the memory includes a non-volatile memory.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:
- a display panel in which at least one pixel circuit each including a light emitting diode and a driving transistor connected to the light emitting diode is disposed;
- a memory configured to store a first current value corresponding to a first temperature and a second current value corresponding to a second temperature;
- a temperature sensor; and
- a control circuit configured to identify a threshold voltage of the driving transistor using the first current value when a temperature sensed by the temperature sensor corresponds to the first temperature, and identify the threshold voltage of the driving transistor using the second current value when the temperature sensed by the temperature sensor corresponds to the second temperature, wherein the control circuit includes:
- a sensing circuit including a converter circuit which converts an analog electric signal into a digital electric signal and a range adjusting circuit which adjusts a conversion data range of the converter circuit; and
- a timing control circuit, wherein the control circuit sets a conversion data range of the converter circuit to a first range in response to the first temperature and the conversion data range of the converter circuit to a second range in response to the second temperature.

2. The display apparatus according to claim 1,
wherein the control circuit inputs one of the first current value and the second current value and selected image data to the at least one pixel circuit, and identifies a threshold voltage and whether the pixel circuit is degraded for the at least one pixel circuit.

3. The display apparatus according to claim 2,
wherein the control circuit identifies one or more light emitting diodes corresponding to a degraded area and one or more light emitting diodes corresponding to a normal area based on whether the pixel circuit is degraded.

4. The display apparatus according to claim 3,
wherein the control circuit identifies a first average threshold voltage of the one or more light emitting diodes corresponding to the degraded area, and a second average threshold voltage of the one or more light emitting diodes corresponding to the normal area.

5. The display apparatus according to claim 4,
wherein the control circuit compensates for the display panel using a difference of the first average threshold voltage and the second average threshold voltage.

6. The display apparatus according to claim 2,
wherein when an accumulated driving time of the display panel is equal to or longer than a first time, the control circuit identifies the threshold voltage of the at least one pixel circuit and whether the at least one pixel circuit is degraded.

7. The display apparatus according to claim 1,
wherein the first range is a range including a voltage value lower than a voltage value of the second range.

8. The display apparatus according to claim 1,
wherein the first temperature corresponds to a temperature range higher than a room temperature and the second temperature corresponds to a room temperature range.

9. The display apparatus according to claim 1,
wherein the memory includes a non-volatile memory.

10. An operating method of a display apparatus, the operating method comprising:
- sensing a temperature corresponding to the display apparatus by a temperature sensor;
- identifying a current value corresponding to a temperature range in which the temperature is included;
- identifying a threshold voltage of a driving transistor based on the current value; and
- compensating a display panel included in the display apparatus based on the threshold voltage; and
- setting a conversion data range of a converter circuit included in the display apparatus to a first range when the temperature is included in a first temperature range, and setting the conversion data range to a second range when the temperature is included in a second temperature range, wherein when the temperature is included in the first temperature range, the current value corresponds to a first current value and when the temperature is included in the second temperature range, the current value corresponds to a second current value, the first current value is larger than the second current value, and the first temperature range is higher than the second temperature range.

11. The operating method according to claim 10, wherein the identifying a threshold voltage includes:
inputting the current value and selected image data to at least one pixel circuit included in the display apparatus; and
identifying a threshold voltage of each of the at least one pixel circuit and whether the at least one pixel circuit is degraded.

12. The operating method according to claim 11, further comprising:
identifying one or more pixel circuits corresponding to a degraded area and one or more pixel circuits corresponding to a normal area, based on whether the at least one pixel circuit is degraded; and
identifying a first average threshold voltage of the one or more pixel circuits corresponding to the degraded area and a second average threshold voltage of the one or more pixel circuits corresponding to the normal area.

13. The operating method according to claim 12, wherein the compensating includes:
compensating for the display panel based on a difference of the first average threshold voltage and the second average threshold voltage.

14. The operating method according to claim 10, wherein the first range is a range including a voltage value lower than a voltage value of the second range.

15. The operating method according to claim 10, wherein the sensing a temperature includes:
sensing the temperature by the temperature sensor when an accumulated driving time of the display panel is equal to or longer than a first time.

16. The operating method according to claim 10, wherein a current value corresponding to a temperature range in which the temperature is included is stored in a memory of the display apparatus, and the memory includes a non-volatile memory.

* * * * *